(12) United States Patent
Lection et al.

(10) Patent No.: US 7,636,881 B2
(45) Date of Patent: Dec. 22, 2009

(54) DISPLAYING A PORTAL WITH RENDER-WHEN-READY PORTLETS

(75) Inventors: David B. Lection, Raleigh, NC (US);
Eric L. Masselle, Raleigh, NC (US);
Mohamad R. Salahshoor, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 11/171,120

(22) Filed: Jun. 30, 2005

(65) Prior Publication Data
US 2007/0005731 A1 Jan. 4, 2007

(51) Int. Cl.
*G06F 17/00* (2006.01)
(52) U.S. Cl. .................................................. 715/205
(58) Field of Classification Search .............. 715/501.1, 715/513, 207, 208, 205, 209
See application file for complete search history.

(56) References Cited

U.S. PATENT DOCUMENTS

| | | | |
|---|---|---|---|
| 6,327,628 B1 | 12/2001 | Anuff et al. | |
| 6,677,964 B1 | 1/2004 | Nason et al. | |
| 6,735,586 B2 | 5/2004 | Timmons | |
| 7,146,563 B2* | 12/2006 | Hesmer et al. | 715/507 |
| 7,228,496 B2* | 6/2007 | Hamada | 715/513 |
| 7,451,194 B2* | 11/2008 | Bowser et al. | 709/219 |
| 2002/0087667 A1 | 7/2002 | Andersen | |
| 2002/0124022 A1* | 9/2002 | Yoo | 707/513 |
| 2003/0167315 A1* | 9/2003 | Chowdhry et al. | 709/218 |
| 2003/0188163 A1* | 10/2003 | Fischer et al. | 713/170 |
| 2004/0003096 A1* | 1/2004 | Willis | 709/228 |
| 2004/0199541 A1* | 10/2004 | Goldberg et al. | 707/104.1 |
| 2004/0205555 A1* | 10/2004 | Hind et al. | 715/513 |
| 2005/0055634 A1* | 3/2005 | Burns et al. | 715/517 |
| 2005/0108574 A1* | 5/2005 | Haenel et al. | 713/201 |
| 2005/0262435 A1* | 11/2005 | Ramanujan | 715/513 |
| 2006/0015846 A1* | 1/2006 | Fraleigh et al. | 717/109 |

(Continued)

OTHER PUBLICATIONS

Levy et al., Improving Understanding of Website Privacy Policies with Fine-Grained Policy Anchors, ACM 2005, pp. 480-488.*

(Continued)

*Primary Examiner*—Cong-Lac Huynh
(74) *Attorney, Agent, or Firm*—Andre Gibbs, Esq.; Steven M. Greenberg, Esq.; Carey, Rodriguez, Greenberg & Paul, LLP

(57) ABSTRACT

Embodiments of the present invention address deficiencies of the art in respect to portal view rendering and provide a method, system and computer program product for portlet view processing with render-when-ready portlets. In one embodiment, a portal server system can be provided which can include a portal server configured to render a portal page, and a portlet aggregator configured to provide portlet markup for different portlets in different temporary documents linked to the portal page. The different temporary documents can be linked to the portal page through corresponding hidden frames disposed in the portal page. Moreover, each of the different temporary documents can include a script programmed to write contained portlet markup to an element in the portal page responsive to a triggering event. Finally, the portal page can include one or more span elements, each of the span elements being referenced by the script in a corresponding one of the different temporary documents.

10 Claims, 2 Drawing Sheets

U.S. PATENT DOCUMENTS

| | | | |
|---|---|---|---|
| 2006/0034434 A1* | 2/2006 | Kashi | 379/93.07 |
| 2006/0041637 A1* | 2/2006 | Jerrard-Dunne | 709/219 |
| 2006/0069714 A1* | 3/2006 | Blount et al. | 709/203 |
| 2006/0080612 A1* | 4/2006 | Hayes et al. | 715/742 |
| 2006/0095676 A1* | 5/2006 | Dzierzon et al. | 711/133 |
| 2006/0129935 A1* | 6/2006 | Deinlein et al. | 715/733 |
| 2006/0195779 A1* | 8/2006 | McElroy et al. | 715/501.1 |
| 2006/0230062 A1* | 10/2006 | Roy-Chowdhury et al. | 707/103 X |
| 2007/0055930 A1* | 3/2007 | Jerrard-Dunne et al. | 715/523 |
| 2007/0055942 A1* | 3/2007 | Hesmer et al. | 715/742 |
| 2007/0118794 A1* | 5/2007 | Hollander et al. | 715/512 |
| 2007/0233871 A1* | 10/2007 | Fletcher et al. | 709/226 |
| 2008/0134014 A1* | 6/2008 | Hind et al. | 715/205 |
| 2008/0270929 A1* | 10/2008 | Bohn et al. | 715/772 |

OTHER PUBLICATIONS

Diaz et al., Portlet Syndication: Raising Variability Concerns, ACM Nov. 2005, pp. 627-659.*

Diaz et al., Invoking Web Applications from Portals: Customisation Implications, Google, 2004, pp. 75-84.*

Wang et al. Portlet, WSRP and Application, Google, Mar. 2005, pp. 1-55.*

Schaeck, Web Services for Remote Portals (WSRP) Whitepaper, Google, Sep. 22, 2002, pp. 1-18.*

Diaz et al., Improving Portlet Interoperability through Deep Annotation, ACM May 2005, pp. 372-381.*

Allan et al., Portals and Portlets 2003, Google 2004, pp. 1-40.*

Diaz et al., Portlets as Web Components: an Introduction, Google 2004, pp. 1-19.*

Diaz et al., Invoking Web Applications from Portals: Customisation Implications, Google 2004, 75-84.*

*A process for the blending of web content*, Research Disclosure, Apr. 2000, pp. 778-779.

Pierce, Marlon et al; *Interoperable Web Services for Computational Portals*, 0-7695-1524-X/02, 2002, IEEE, pp. 1-12.

Ginsburg, Mark, *The Catacomb Project: Building a User-Centered Portal the Conversational Way*, WIDM '02, Nov. 8, 2002, pp. 84-87.

Donnelly, Vanessa, et al, *Community Portals Through Communitization*, CUU '03, Nov. 10-11, 2003, Vancouver, British Columbia, CA, pp. 9-14.

Bellas, Fernando, et al, *A Flexible Framework for Engineering "My" Portals*, WWW 2004, May 17-22, 2004, NY ACM 1-58113-844-X/04/0005, pp. 234-242.

* cited by examiner

DISPLAYING A PORTAL WITH RENDER-WHEN-READY PORTLETS

BACKGROUND OF THE INVENTION

1. Field of the Invention

The present invention relates to the field of portal environment management and more particularly to rendering portlet content within a portal view.

2. Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Portals represent a sensible solution to the problem of aggregating content through a channel paradigm in a single, network-addressable location. In consequence, portals have become the rage in content distribution.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

Portals display an aggregation of markup that can, and frequently does, originate from multiple content sources. The performance and availability of any one of these sources can have a profound effect upon the end user experience with a portal, since the entire portal display must be aggregated prior to rendering the portal in a client viewer. Specifically, the various pieces of component markup are provided by the portlets contained on a page, and the slowest portlet acts, in effect, as the weakest link in a chain, by delaying the rendering of the entire display, even when every other portlet has completed construction of its markup.

BRIEF SUMMARY OF THE INVENTION

Embodiments of the present invention address deficiencies of the art in respect to portal view rendering and provide a novel and non-obvious method, system and apparatus for portlet view processing with render-when-ready portlets. In one embodiment, a portal server system can be provided. The portal server system can include a portal server configured to render a portal page, and a portlet aggregator configured to provide portlet markup for different portlets in different temporary documents linked to the portal page. The different temporary documents can be linked to the portal page through corresponding hidden frames disposed in the portal page. Moreover, each of the different temporary documents can include a script programmed to write contained portlet markup to an element in the portal page responsive to a triggering event. Finally, the portal page can include one or more span elements, each of the span elements referencing the script in a corresponding one of the different temporary documents.

In another embodiment of the invention, a method can be provided for displaying a portal page with render-when-ready portlets. The method can include modifying different requests for portlet markup for a portal page to divert the portlet markup to different temporary documents. The method further can include linking each of the temporary documents to the portal page. Finally, the method can include rendering the portlet markup in each of the temporary documents in the portal page responsive to loading the portlet markup in the temporary document. Optionally, a refresh interval for the portlet markup can be obtained and a timer script in the portlet markup can be activated to independently cause a refreshing of the portlet markup when the refresh interval expires.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for processing a portal view with render-when-ready portlets. In accordance with an embodiment of the present invention, individual portlets can be directed to write markup to separate, hidden frames associated with separate temporary documents coupled to a portlet view. The temporary documents each can include logic to initiate a refresh within the portlet view when the portlet markup is completely written to the corresponding frame. In this way, the portlets of the portal view can be rendered when ready for rendering and the portlets of the portal view need not wait until the slowest portlet in the portal view has completed preparing itself for rendering prior to rendering the entirety of the portal view.

Figure 1:
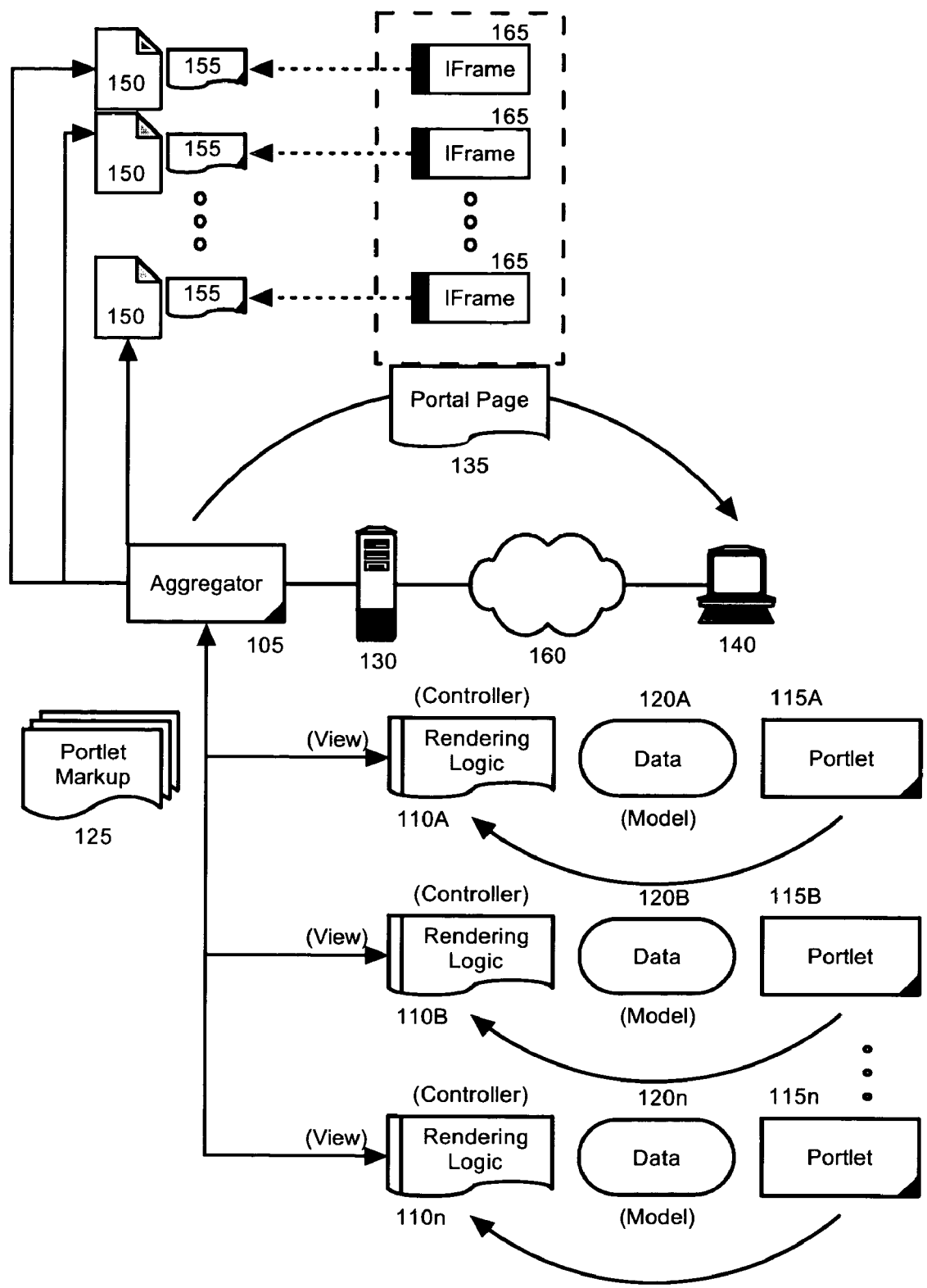
FIG. 1 is a schematic illustration of a portal environment configured to accommodate render-when-ready portlets.

In more particular illustration, FIG. 1 is a schematic illustration of a portal server system which has been configured to process a portal view with render-when-ready portlets. The portal server system can include a portal page 135 communicatively coupled to a selection of portlet applications 115A, 115B, 115n through a portal server 130. Each portlet application 115A, 115B, 115n can produce a view based upon portlet data 120A, 120B, 120n in the form of portlet markup 125 through corresponding rendering logic 110A, 110B, 110n. Notably, the rendering logic 110A, 110B, 110n can be active markup such as a JSP, in which logical scriptlets can be embedded to produce specific markup language tags.

A portlet aggregator 105 can be coupled to each portlet application 115A, 115B, 115n to receive the portlet markup 125 and to aggregate the portlet markup 125 into view in the portal page 135. By aggregation, it is meant that the individual markup language blocks produced by each portlet 115A, 115B, 115n can be combined into a single cohesive markup language document configured for distribution to and use within a conventional content browser. In this regard, the portal page 135 can be disposed in the portal server 130 from which the portal 135 can be accessed by client content browsing devices 140 over a computer communications network 160 such as a local computer communications network, for instance a private intranet, or a global computer communications network, for instance the public Internet.

In accordance with an embodiment of the present invention, the portlet aggregator 105 can include logic to modify each request for portlet markup 125 to provide the portlet markup 125 to a corresponding temporary document 150 created by the portlet aggregator 105. Each temporary document 150 can include a script 155 to write the portlet markup 125 of the temporary document 150 to an element in the portal page 135. The script 155 can be executed when an "on load" triggering event occurs in the temporary document 150. To that end, the script 155 can be dynamically incorporated into a temporary document 150 that specifies a named span element. Consequently, at the on load event, the script 155 can write the content of the temporary document 150 to the portal view page 135. Optionally, the skin for the portal page 135 can be included in the temporary document 150, or the skin can be displayed immediately on the portal page 135. Finally, the aggregator 105 can configure the portal page 135 with hidden frames 165, each hidden frame referring to one of the temporary documents 150.

In consequence of the foregoing arrangement, each of the portlets 115A, 115B, 115C can provide its corresponding markup to a separate temporary document 150 rather than a single document (the portal page 135, itself). Further, each of the temporary documents 150, can write its respective content—when that content is ready to render—to an element of the portal page 135. Since no one of the portlets 115A, 115B, 115C need wait for any other of the portlets 115A, 115B, 115C to construct markup, the markup stream for the portal page 135 can be displayed immediately.

It will be recognized by the skilled artisan that, because the markup is created with the same skin as originally specified, there is no alteration of the layout of the portal page 135. Thus, there will be no introduction of unwanted scroll bars, no messages that a slow portlet has broken, or other such unwanted side effects. Additionally, a more secure form of the portal page 135 can be realized in as much as the source for each portlet can be hidden from view of the end user as the source resides in the temporary document 150 and not in the portal page 135.

Figure 2:
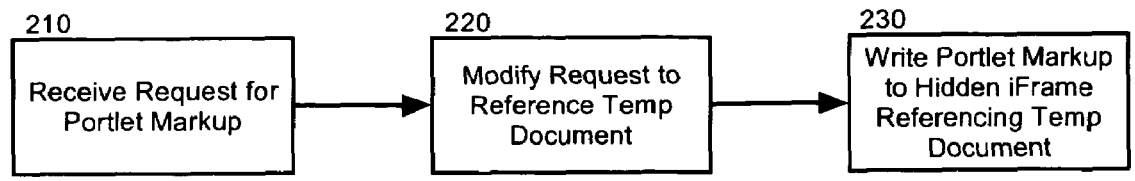
FIG. 2 is a flow chart illustrating a method for processing a portal view with render-when-ready portlets in the portal environment of FIG. 1; and, FIG. 3 is a flow chart illustrating a method for granularly refreshing individual render-when-ready portlets in the portal environment of FIG. 1.

In further illustration of the operation of the aggregator 105 of the portal system of FIG. 1, FIG. 2 is a flow chart illustrating a method for processing a portal view with render-when-ready portlets. Beginning in block 210, a request can be received for a portlet to provide its markup. In block 220, the request can be modified to request that the portlet provide its markup to a temporary document created by the aggregator. The temporary document can be created to include script logic to write its content to an element within a portal page responsive to the loading of the temporary document. Finally, in block 230, the portlet markup can be written to the temporary document and a hidden frame in the portal page can be generated to reference the temporary page as the source of the hidden frame.

Figure 3:
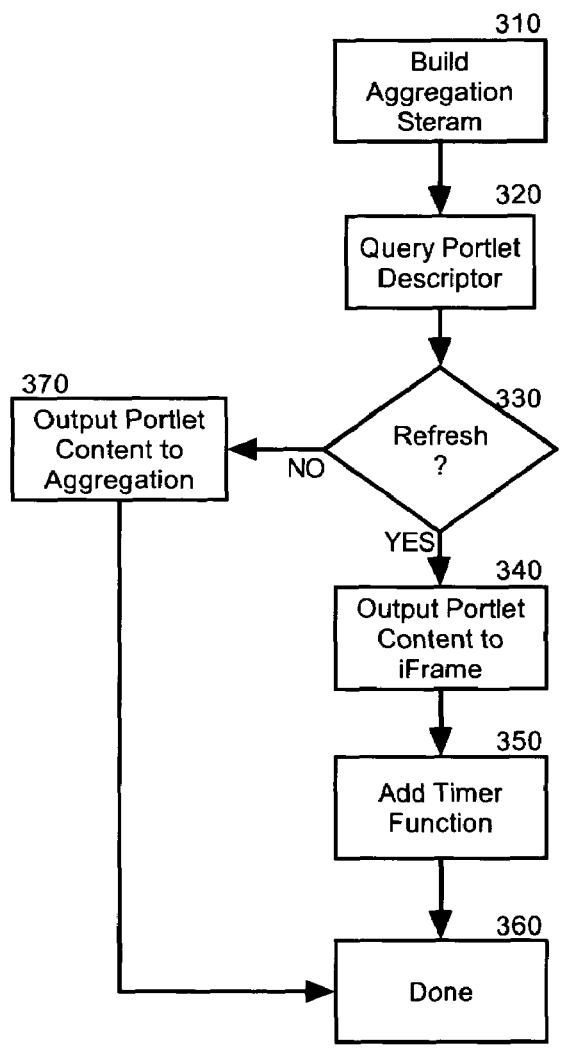

Notably, the render-when-ready configuration of the present invention can be applied to allow the timely refreshing and updating of portlet content in a portal view. Specifically, render-when-ready portlets can be assigned to portlets requiring dynamic refreshing and updating at a prescribed interval to allow for a self-initiated refresh of the portlet content. In more particular illustration, FIG. 3 is a flow chart illustrating a method for granularly refreshing individual render-when-ready portlets in the portal environment of FIG. 1.

Beginning in block 310, an aggregation stream can be constructed for a portal page. In block 320, the portlet descriptor for the first portlet can be queried to determine whether a dynamic refresh interval has been specified. As an example, the portlet descriptor for a portlet requiring dynamic refreshing and updating can include markup specifying a refresh rate such as <REFRESH-RATE>value</REFRESH-RATE> where value is a refresh interval. If a refresh interval is not specified, the portlet markup can be output to the portal page in block 370. However, if a refresh interval has been specified, the portlet markup can be configured for dynamic refreshing and updating in block 340.

Also, in block 350 a timer function can be written to the portlet. The timer function can include logic to count down from a specified time and to trigger a portlet refresh event by submitting the content of the portlet to the portal server which can request that the portlet refresh its content. The refreshed content, in turn, can be provided to a temporary document referenced by a hidden frame in the portal page. Subsequently, the timer can be reset and the process can end in block 360.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for displaying a portal page with render-when-ready portlets, the method comprising:
    modifying different requests for portlet markup for a portal page to divert said portlet markup to different temporary documents;
    linking each of said temporary documents to said portal page; and,
    rendering said portlet markup in each of said temporary documents in said portal page responsive to loading said portlet markup in said temporary document.

2. The method of claim 1, further comprising inserting script logic in each of said temporary documents, said script logic comprising code to write contained portlet markup to an element in said portal page responsive to a triggering event.

3. The method of claim 2, wherein linking each of said temporary documents to said portal page comprises inserting a plurality of hidden frames in said portal page, each of said hidden frames referencing a corresponding one of said temporary documents as a source document.

4. The method of claim 3, wherein linking each of said temporary documents to said portal page further comprises inserting a plurality of span elements in said portal page, each of said span elements being referenced said script logic in a corresponding one of said temporary documents.

5. The method of claim 1, further comprising:
    obtaining a refresh interval for said portlet markup; and,
    activating a timer script in said portlet markup to independently cause a refreshing of said portlet markup when said refresh interval expires.

6. A computer program product comprising a computer usable medium having computer usable program code for displaying a portal page with render-when-ready portlets, said computer program product including:
    computer usable program code for modifying different requests for portlet markup for a portal page to divert said portlet markup to different temporary documents;
    computer usable program code for linking each of said temporary documents to said portal page; and,
    computer usable program code for rendering said portlet markup in each of said temporary documents in said portal page responsive to loading said portlet markup in said temporary document.

7. The computer program product of claim 6, further comprising computer usable program code for inserting script logic in each of said temporary documents, said script logic comprising code to write contained portlet markup to an element in said portal page responsive to a triggering event.

8. The computer program product of claim 7, wherein said computer usable program code for linking each of said temporary documents to said portal page comprises computer usable program code for inserting a plurality of hidden frames in said portal page, each of said hidden frames referencing a corresponding one of said temporary documents as a source document.

9. The computer program product of claim 8, wherein said computer usable program code for linking each of said temporary documents to said portal page further comprises computer usable program code for inserting a plurality of span elements in said portal page, each of said span elements referencing said script logic in a corresponding one of said temporary documents.

10. The computer program product of claim 6, further comprising:
    computer usable program code for obtaining a refresh interval for said portlet markup; and,
    computer usable program code for activating a timer script in said portlet markup to independently cause a refreshing of said portlet markup when said refresh interval expires.

* * * * *

UNITED STATES PATENT AND TRADEMARK OFFICE
CERTIFICATE OF CORRECTION

PATENT NO. : 7,636,881 B2  Page 1 of 1
APPLICATION NO. : 11/171120
DATED : December 22, 2009
INVENTOR(S) : Lection et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this

Ninth Day of November, 2010

David J. Kappos
*Director of the United States Patent and Trademark Office*